US005392403A

United States Patent [19]

Kaufmann

[11] Patent Number: 5,392,403

[45] Date of Patent: Feb. 21, 1995

[54] CIRCUIT ARRANGEMENT EMPLOYING A MICROPROCESSOR MODULE FOR DATA CONVERSION IN A DATA TRANSMISSION BETWEEN A PERSONAL COMPUTER AND COMMUNICATION EQUIPMENT

[75] Inventor: Peter Kaufmann, Gilching, Germany

[73] Assignee: Siemens Aktiengesellschaft, Munich, Germany

[21] Appl. No.: 872,368

[22] Filed: Apr. 23, 1992

[30] Foreign Application Priority Data

Apr. 29, 1991 [DE] Germany ............................ 4113987

[51] Int. Cl.[6] .............................................. G06F 13/00

[52] U.S. Cl. .................................... 395/275; 364/940; 364/942.6; 364/238; 364/238.5

[58] Field of Search ................................ 395/200, 275

[56] References Cited

U.S. PATENT DOCUMENTS 4,953,930 9/1990 Ramsey et al. .................. 350/96.11

FOREIGN PATENT DOCUMENTS

0358597A2 3/1990 European Pat. Off. ..... H04Q 11/04

0367270A2 5/1990 European Pat. Off. .... H04M 19/08

OTHER PUBLICATIONS

8213 Computer Networks and ISDN Systems 17 Jul. 10, 1989, No. 2 "The A-ISDN Proposal to Bridge Personal Computers and ISDN", Jaap Van Till, pp. 149-152.

Papers presented at ISDN Europe 86 the First Pan European Conference on ISDN, held 5-7 Nov., 1986—Peter Schulthess et al, "Experience with an integrated Digital PBX in a University Environment", pp. 45-51.

AT&T Technology Products, Systems and Services, vol. 1, No. 1, 1986, "The PC/PBX Connection", pp. 36 and 37.

202 Funkschau (1989) 6 Oct., No. 21, Muenchen, DE, Industriestandards fur die Sprache der Modems. pp. 40-42.

NTG—Fachtagung 'Wege zum integrierten Kommunikationsnetz', Mar. 25-27, 1985, Berlin, DE, NTG—Fachberichte Nr. 88, pp. 277-283, VDE-Verlag, Berlin, DE; F. Kaderali et al, "Diensteintegration in Nebenstellenanlagen."

*Primary Examiner*—Robert L. Richardson

*Attorney, Agent, or Firm*—Hill, Steadman & Simpson

[57] ABSTRACT

A circuit arrangement is disclosed for data conversion in an asynchronous, bidirectional data transmission between a serial data interface of a personal computer and a serial data interface of an expansion point of a communication equipment, particularly a subscriber terminal equipment. The procedures implemented in the microprocessor module of the circuit arrangement convert data for the selection of a telecommunication subscriber into a pulse sequence corresponding to the communication equipment, and also convert communication procedures between the personal computer and a communication equipment as well as status requests of performance features of the communication equipment.

7 Claims, 4 Drawing Sheets

Tele Communication Equipment
T
E2
Serial Data Interface
SK
VL
AEM
Decoupling Module
SV
Power Supply Module
SEM
EM
SVA
EEM
AMP
Microprocessor
SMP
UART2
µP
Control Unit
UART1
Receiver/ Transmitter Modules
MP
EMP
ATR
STR
TR
Level-converting Module
ETR
PC
PC-Karte
PC Card
COMP
Serial Data Interface
Personal Computer TRANSPARENT
READ CHARACTER FROM PC
START OF MESSAGE
NO
TRANSPARENT
YES
STORE IN QUEUE
READ HEADER OF MESSAGE FROM PC
STORE IN QUEUE
READ CHARACTER FROM PC
STORE IN QUEUE
END OF MESSAGE
NO
YES
CLOSE COMMAND
NO
TRANSPARENT
YES
START V24

START DEVICE
POWER UP RESET
READ AND STORE TYPE OF PHONE
WAIT FOR POLLADR.
OWN ADR.
NO
YES
DATA FROM PHONE AVAILABLE
NO
YES
READ MESSAGE FROM PHONE
TRANSPARENT MODE ACTIVE ?
NO
SEND MESSAGE TO PC
QUEUE EMPTY
YES
ACK POLLADDR.
NO
SEND NEXT MESSAGE FROM QUEUE TO PHONE

CIRCUIT ARRANGEMENT EMPLOYING A MICROPROCESSOR MODULE FOR DATA CONVERSION IN A DATA TRANSMISSION BETWEEN A PERSONAL COMPUTER AND COMMUNICATION EQUIPMENT

BACKGROUND OF THE INVENTION

The personal computer has enjoyed more and more frequent and versatile application in commercial and private areas in communications technology, particularly in telecommunications. A comfortable user surface enables an uncomplicated operation and utilization of the personal computer. In telecommunications, the personal computer can be coupled, for example, to a subscriber terminal equipment (telephone, switching system). The services (for example telephone number register, computer-assisted dialing, telephone manager) that are possible in telecommunications technology can be designed more transparent and user-friendly for the telecommunication subscriber on the basis of this combination. The combination of personal computer/subscriber terminal equipment makes it possible for the telecommunication subscriber to select the call numbers of another telecommunication subscriber stored in the personal computer from a telephone number register and to initiate a call set-up with the personal computer. It is of particular help in the selection of a telecommunication subscriber when telephone numbers from an electronic telephone book can be selected at the personal computer and connections can be set up to other telecommunication subscribers.

The invention is directed to a circuit arrangement for data conversion in a data transmission between a serial data interface of a personal computer and a serial data interface of a communication equipment.

Given a combination of a personal computer with a subscriber terminal equipment such as, for example, a switching system or an added-feature telephone having a plurality of function keys, additional transmission paths are required within the device combination. Communication is required due to the collaboration of the personal computer with the communication equipment. This requires a continuous occupation of a V.24 data interface at the personal computer.

Up to now, it was standard to employ a specific modem (Hayes modem) given a telephone number selection implemented with the personal computer. These modems are thereby installed, for example, at an interchange point between a public communication network and private lines. A further possibility of arranging a Hayes modem in system-oriented fashion given the combination of personal computer and subscriber terminal equipment is that the Hayes modem is integrated on a PC card and is inserted in the personal computer at a free card slot. A specific PC card, for example a plug-in modem having a connected telephone, assumes the function of the Hayes modem. The occupation of a PC card slot and/or the occupation of at least one defined data interface considerably limits the possible use of the personal computer. In favor, for example, of a telecommunications-oriented use of the personal computer, the integration of circuits for system expansion that are implementable on pluggable PC cards must thus be foregone.

SUMMARY OF THE INVENTION

It is an object of the invention to disclose a way, given optimally low hardware and/or software load on a personal computer, to enable a selection of telecommunications subscribers and the control of communication procedures proceeding from a personal computer connected to the telecommunications equipment.

This object is achieved in accordance with the invention by providing a circuit arrangement for data conversion in a data transmission between a serial data interface of a personal computer and a serial data interface of the communication equipment. A microprocessor module is arranged between a level-converting module and a decoupling module, the microprocessor module comprising a serial-to-parallel converter arranged at an input side thereof, a parallel-to-serial converter arranged at an output side thereof, and a control means for converting data according to a given procedure. The level-converting module has its input side connected to the serial data interface of the personal computer and its output side connected to the serial-to-parallel converter. The decoupling module which is provided has means for electrical isolation of the communication equipment from the personal computer, and has its output side connected to the serial data interface of the communication equipment and its input side connected to the parallel-to-serial converter.

The invention is distinguished by the advantage that a selection of a telecommunication subscriber as well as communication procedures between a personal computer and a subscriber terminal equipment are possible without auxiliary hardware equipment. A PC slot is not occupied. A limitation in the expansion of the personal computer (for example, graphics card, memory card . . . ) or an abandonment of periphery equipment due to a permanently occupied PC slot or a special data interface is not necessary. Beyond this, it is especially advantageous to achieve cross-system procedures such as, for example, the control or interrogation of function keys of a subscriber terminal equipment connected to a personal computer. The data transmission between the personal computer and the communication equipment thereby advantageously occurs only over a serial data interface at the personal computer. Furthermore, the afore-mentioned performance features are not blocked by the outage of the personal computer given a malfunction in the operating system of the personal computer. An uncomplicated unplugging of a plug-type connection at the data interface at the malfunctioning personal computer and a new connection of the plug-type connection to a data interface at an operational personal computer enables an immediate re-employment of the described performance features.

A further development of the invention is that the input of the microprocessor module can be input with Hayes command input data. The microprocessor module converts the data into a pulse sequence adapted to the telecommunications equipment so that a connection to other subscriber terminal equipment or data processing systems is achieved via a telecommunications equipment connected to a switching system.

A development of the invention is that the microprocessor module can be switched into a transparent condition by an instruction mode, this yielding the advantage that a broader signaling than the known Hayes command is possible between the telecommunications equipment and the connected personal computer. A control of more complex procedures including status requests of supplementary performance features thereby becomes possible. This yields the advantage that an expanded user surface for the subscriber terminal equipment is achieved given an appropriate selection. Beyond this, function requests are possible in the subscriber terminal equipment. This yields the advantages that, for example, a constant function and status check can be implemented via performance features that are integrated in the subscriber terminal equipment.

In a further development of the invention, the components employed in the decoupling module for the electrical isolation of the personal computer and the communication equipment can be opto-couplers. This yields the advantage that a potential difference with respect to ground potential does not lead to the destruction of electronic circuits in the personal computer or in the communication equipment.

DESCRIPTION OF THE PREFERRED EMBODIMENTS

Figure 1:
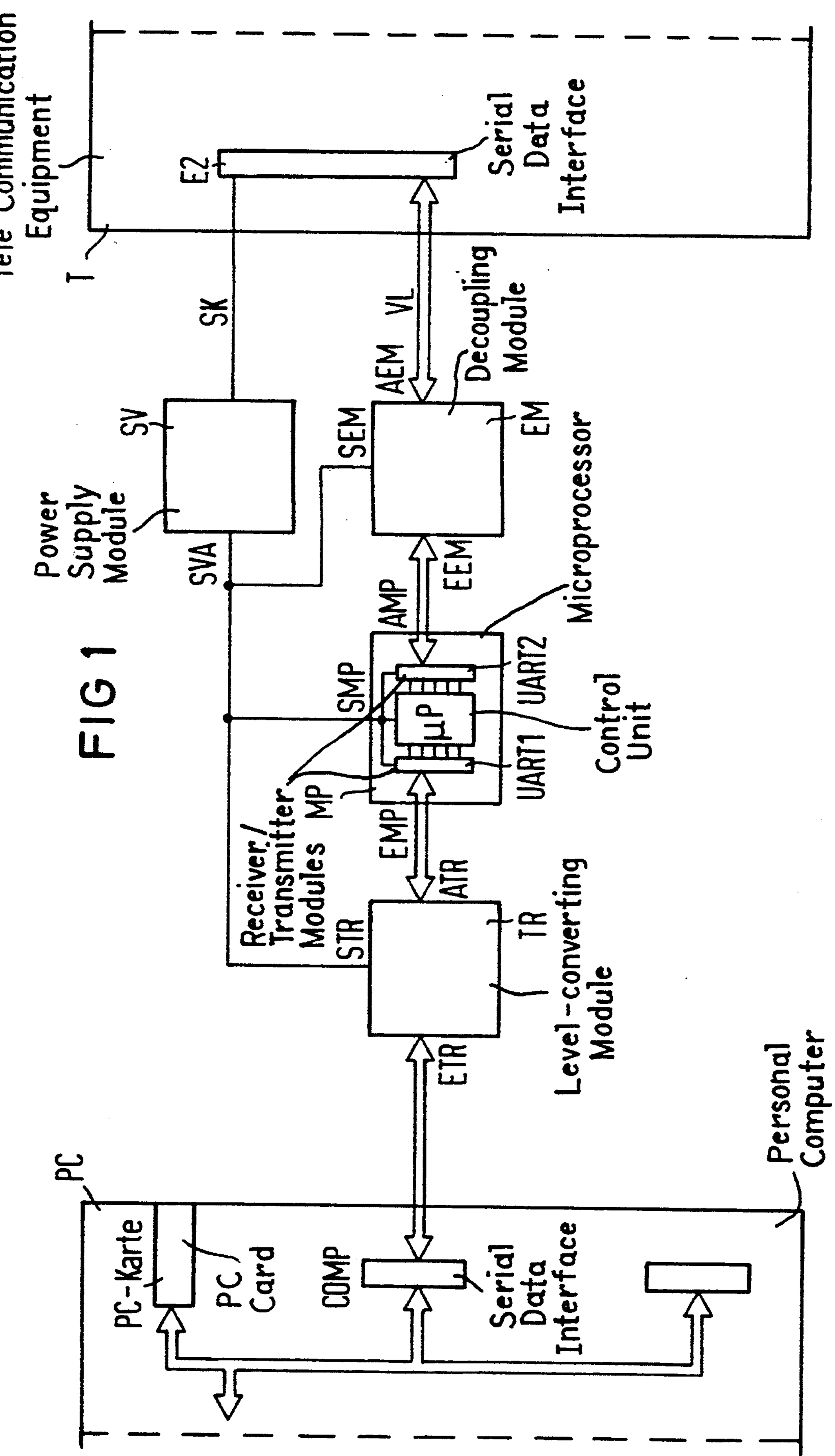
FIG. 1 is a block circuit diagram of a circuit arrangement according to the invention.

FIG. 1 schematically illustrates, in a scope necessary for an understanding of the invention, a circuit arrangement for data conversion in an asynchronous, bidirectional data transmission. The circuit arrangement is essentially formed by a level-converting module TR, a microprocessor module MP, a decoupler module EM, and a power supply module SV.

The input ETR of the level-converting module TR is connected to a serial data interface COMP (COM-Port) of the personal computer PC. Given a selection of a communication subscriber via the keyboard of the personal computer PC, this selection is input with the corresponding Hayes command. The signal level of the coded data present at the input side at the level-matching module TR corresponds to a V.24 signal level. Receiver modules are utilized in the level-matching module TR that convert the V.24 level into the TTL level and the TTL level into the V.24 level. For example, components Max 234 of the MAXIM Company can be employed for this purpose.

The signal level of the coded data is matched at the output ATR of the level-matching module TR to the voltage level needed in the microprocessor MP. Two receiver/transmitter modules UART1, UART2 for the serial-to-parallel and parallel-to-serial conversion of data streams as well as a control unit μP for processing data words are arranged in the microprocessor module MP. A single-chip processor, for example the 80C51 of INTEL, or the 80C31 having an additional EPROM, for example the 27C256, can be utilized as the control unit μP. The serial data present at the input EMP of the microprocessor module MP are converted into parallel data word formats by the first UART1 module. An autonomous module such as, for example, the UART SCC2691 of VALVO, is employed as UART1 for connection to the PC. The control unit μP interprets the data present in data words. Corresponding to the expansion or to a product line of the communication equipment T (for example HICOM, SET 451, 551, 751), the control unit μP of the microprocessor module MP converts the data transmitted from the personal computer PC, for example the Hayes commands, into pulse sequences. These pulse sequences correspond to the pulse sequences that are initialized by the actuation of function keys, for example the selection key or memory keys at the communication equipment T (see FIGS. 2, 3, 4).

The data transmitted from the personal computer PC are then respectively further-processed in the subscriber terminal equipment T as though they had arisen by direct actuation of the function keys.

The decoded and matched data that are present in parallel are converted into a serial data stream by a second receiver/transmitter UART2.

The control signals present at the output of the microprocessor module MP are forwarded to the subscriber terminal equipment T and the serial data interface EZ therein via a decoupling module EM. The serial data interface E2, as an expansion location, is normally provided for the connection of auxiliary equipment. The E2 data interface is constructed for the communication between a plurality of processors 80C51 of INTEL. The method is based on a 9-bit transmission, whereby one bit serves the purpose of distinguishing between address and data information. In a further development, the circuit of the second receiver/transmitter UART2 can be integrated in the 80C51 control unit μP. The data lines between the input EEM and the output AEM of the decoupling module EM are electrically isolated by opto-electrical components, for example opto-couplers. The electrical isolation between personal computer PC and subscriber terminal equipment T would likewise be possible in the level-converting module TR. Dependent on whether the electrical isolation occurs at the data interface side E2 of the subscriber terminal equipment T or following the V.24 interface of the personal computer PC, the 5 volt supply or only the supply of the level-converting modules is electrically isolated from the line feed. For example, opto-couplers having the type designation HCPL 2200 are utilized for the electrical isolation of the electrical signals. The level-converting module, microprocessor module, and the decoupling module are each respectively connected to the power supply module SV by lines STR, SVA; SMP, SVA; SEM, SVA. The power supply module SV is connected to the communication equipment T via a further connection SK. The power supply module SV is connected to the operating voltage deriving from a telephone line via this connection SK. Corresponding to the connected modules, the power supply module SV transforms the operating voltage into the respectively required operating voltage in the connected modules. The power supply module SV is composed of a DC/DC converter that generates 5 V for supplying the electrical components from the telephone line voltage. Discrete components or an integrated component such as, for example, the component PSB2120P of Siemens AG, can be utilized as the DC/DC converter.

Figure 2:
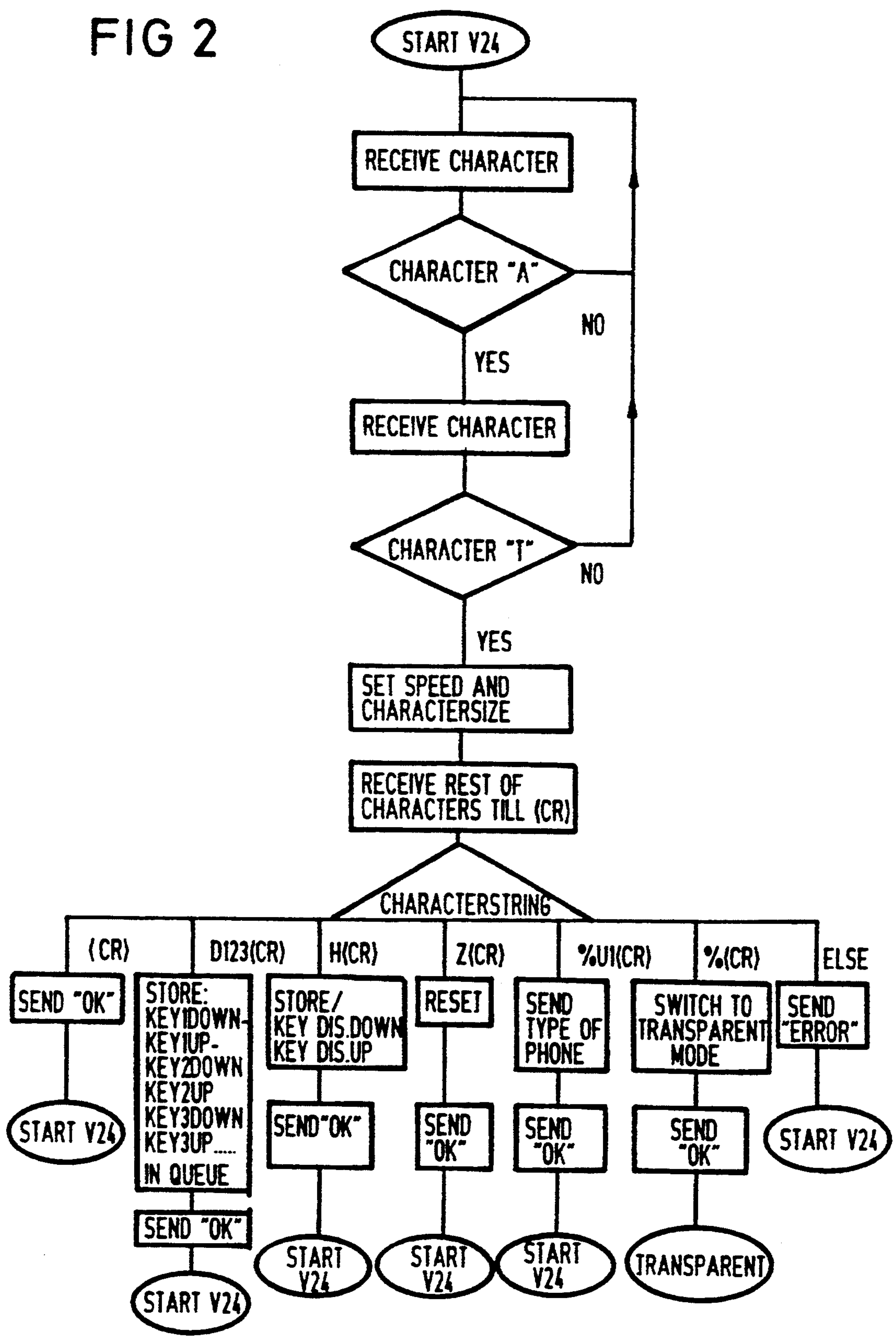
FIG. 2 is a flow chart of a program "Start V.24"

FIG. 2 schematically shows a flow chart of a program "Start V.24". With this program, data are read out, from, example, a memory unit of a personal computer PC, via a data interface COMP and are forwarded to a microprocessor module MP. The data are evaluated in the microprocessor module MP, and a serial-to-parallel converter UART1 is set. The program "Start V.24" implemented in the microprocessor module MP interrogates the data stream coming from the data interface COMP of the personal computer PC until, for example, the data word "A" is present at the input of the microprocessor module MP. After evaluation of the data word, the program execution leads to a following branch. When, for example, a "T" follows as a next data word, then a transmission rate (for example, 300 to 9600 bit/s), a data word length (for example 8 bits) as well as a parity method are recognized from the received data word sequence "AT", and the UART is correspondingly set. When a different data word input follows after the input of the received data word "A", the program returns to its starting address. The procedure of the data word input occurs until the data word sequence "AT" arises. After all data which set the serial-to-parallel converter UART1 are received and have been terminated by an end of line mark [CR], the function of the microprocessor module MP is respectively defined in greater detail by further data words. Following data word sequences are received and interpreted by the microprocessor module MP. In detail, these are the following data word sequences that effect a branching of the program "START V.24":

Input of the end of line mark [CR]:

Whether the communication between the personal computer PC and the microprocessor module MP is functioning can be identified with this dummy command.

Input of the data word sequence d 123 [CR]:

Given input of the data word 1 (selection digit 1), a further data word that emulates the beginning of a key pressure on the "push button 1", and a second data word that emulates the end of the key pressure, are deposited in a queue of a memory unit of the microprocessor MP. The same storing event occurs for the "selection digit 2" and the "selection digit 3".

Input of a data word sequence h [CR]:

A call cleardown occurs after the input of this data word sequence. A data word that initially emulates the end of the key pressure of a disconnect button is thereby entered into the queue of the memory unit of the microprocessor module MP.

Input of a data word sequence z [CR]:

A resetting of the microprocessor module MP occurs after the input of this data word sequence.

Input of a data word sequence % u1 [CR]:

The request to forward the characteristics of the type of the telecommunication equipment T connected to an E2 data interface to the PC occurs after input of the data word sequence.

Following the above-recited data sequences, a transmission of the data word sequence "OK" (command accepted) via the data interface COMP to the personal computer PC occurs as controlled by the control unit of the microprocessor module MP. Following thereupon, the execution routine of the program "START V.24" again begins at its starting address.

Input of a data word sequence % u [CR]:

After input of this data word sequence, the microprocessor module is switched into a transparent mode. After the transmission of the character sequence "OK", the program "START V.24" branches into a program "Transparent" that executes the transparent mode.

When an undefined input of a data word sequence occurs, then the user is alerted by an error display "ERROR", for example at a data viewing means of the personal computer PC.

Figure 3:
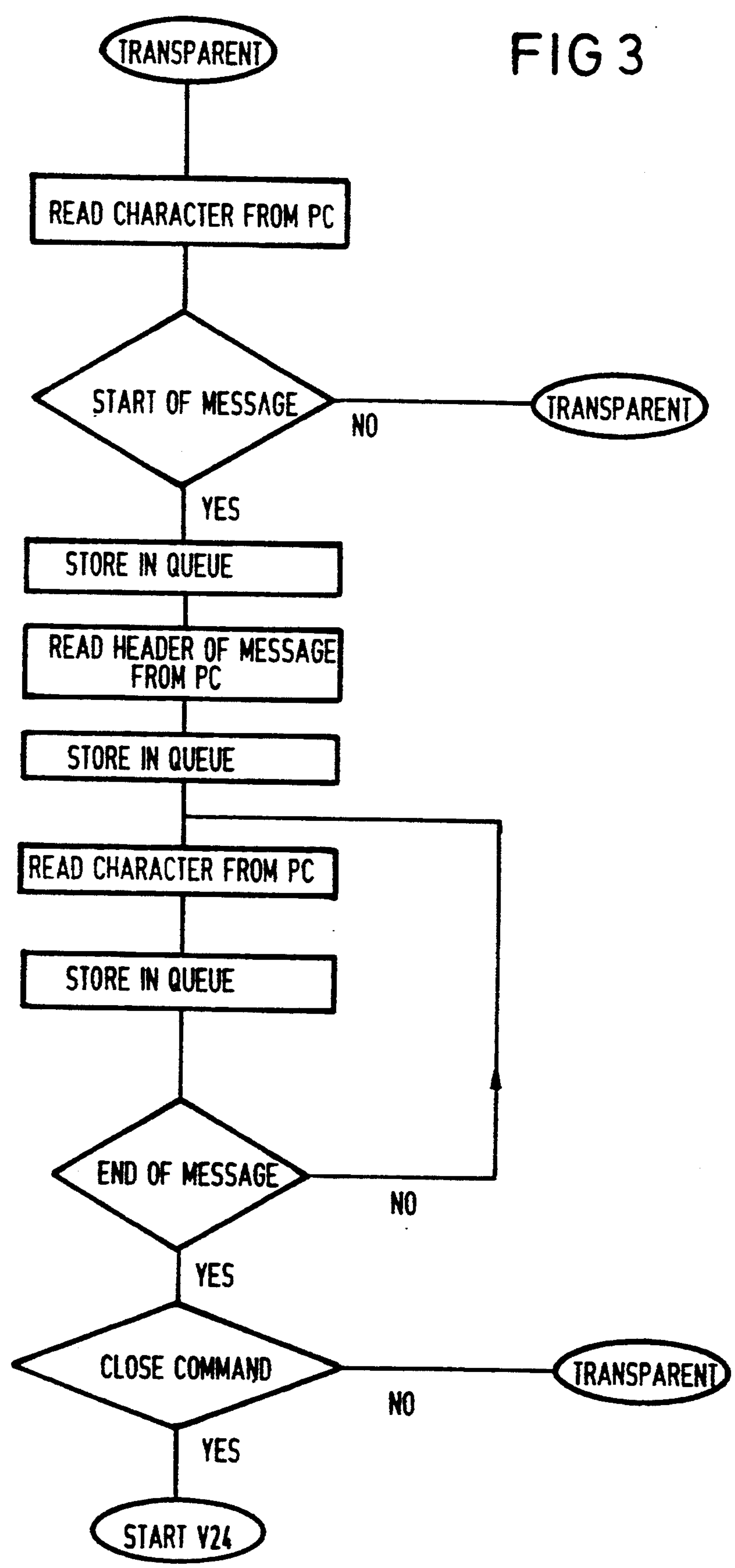
FIG. 3 is a flow chart of a program "Transparent"

FIG. 3 reproduces a program execution of a program "Transparent". In a first program step, a data word is read by the data interface COMP of the personal computer PC. When this data word is not a beginning of a transparent data word sequence, then a return is made to the program start and it waits for the next data word. When the data word is a "Start Character" for data words to be sent (start information, message), it is stored in a waiting queue of a memory unit of the personal computer PC, and the data words subsequently transmitted from the PC are interpreted as start information and are likewise stored in a waiting queue. The data words (message) following thereupon are subsequently received and stored until the end of the message transmitted by the PC is recognized. When the memory capacity of the waiting queue in the memory unit of the microprocessor module MP is exhausted, then the control unit of the personal computer PC is initiated to interrupt the data stream until memory capacity is again present in the waiting queue. When the received data word is a command to end the transparent mode, then a branch is undertaken to the program start of the program "START V.24"; otherwise, a jump is made to the starting address of the program "Transparent" in order to receive the next data words.

Figure 4:
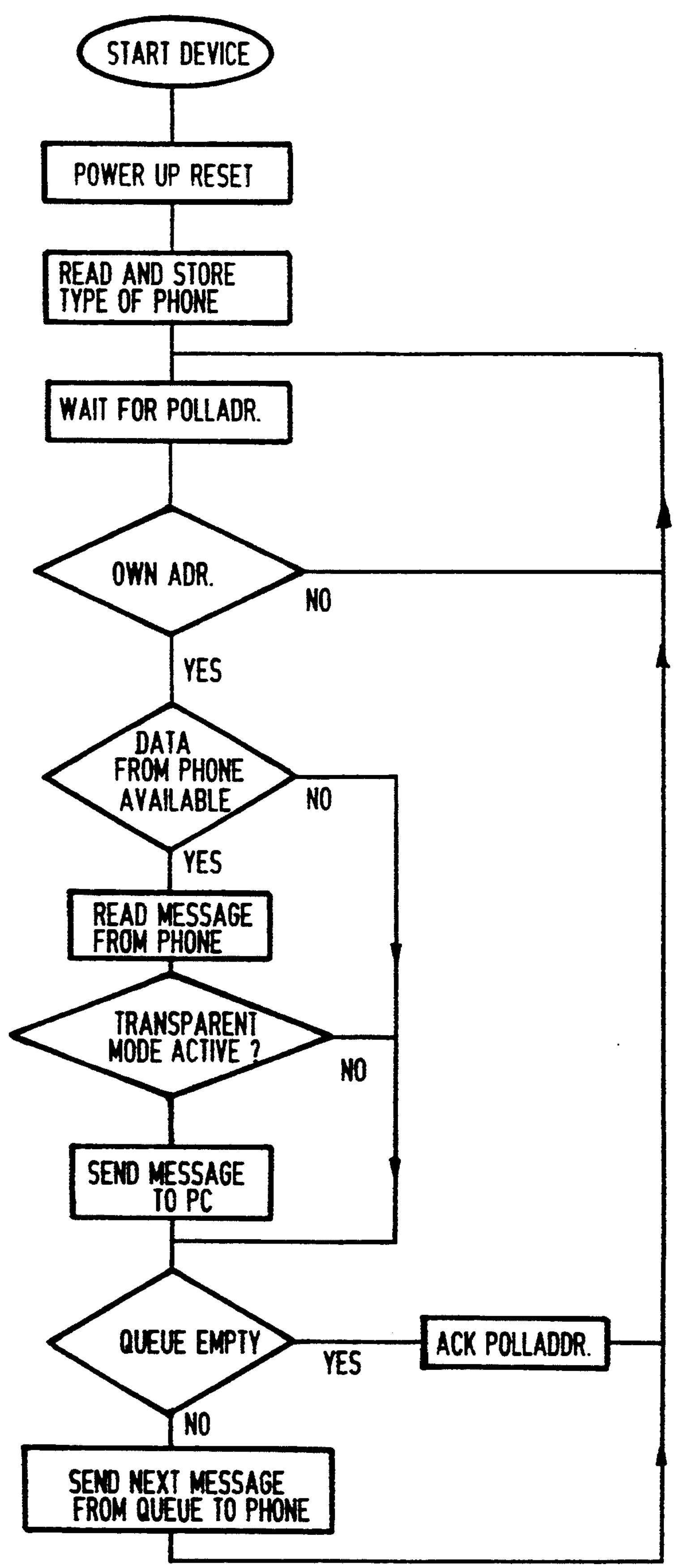
FIG. 4 is a flow chart of a program "Start Device".

FIG. 4 reproduces a program execution of a program "Start Device" that controls an address or data exchange between the microprocessor module MP and the E2 data interface of the telecommunication equipment T. The program "Start Device" begins with a program portion "Power up Reset" that effects an activation of the V.24 and of the E2 interfaces. Following thereupon, data of the telecommunication equipment T (telephone type) connected to the circuit arrangement (see FIG. 1) are read and deposited in a memory unit of the microprocessor module MP. A program branch following thereupon evaluates the poll addresses coming from the telecommunication equipment T. In the no branch, the program waits for the next poll address. In the yes branch, a question is asked whether data follow the addresses. When data follow the addresses, these are read and, in the case of the transparent mode, are forwarded to the PC; when the transparent mode is not active in the microprocessor module MP, this part of the program is skipped over. A check is carried out in a program branch unit following this program module to see whether all data words have already been read out from the waiting queue, i.e. the memory unit. In the no branch, the data words are transmitted to the telecommunication equipment T. When the waiting queue of the memory unit has already been completely read out, then, in the yes branch, the reception of the data words is acknowledged by the telecommunication equipment T. The program waits for the next poll address after the execution of the program step in the no branch or yes branch.

Although various minor changes and modifications might be proposed by those skilled in the art, it will be understood that I wish to include within the claims of the patent warranted hereon all such changes and modifications as reasonably come within my contribution to the art.

I claim as my invention:

1. A circuit arrangement for data conversion in a data transmission between a serial data interface of a personal computer and a serial data interface of a communication equipment, comprising:

- a microprocessor module arranged between a level converting module and a decoupling module, said microprocessor module comprising a serial-to-parallel converter arranged at an input side thereof, a parallel-to-serial converter arranged at an output side thereof, and a control means for converting data according to a given desired procedure;

said level-converting module having its input side connected to the serial data interface of the personal computer and its output side connected to the serial-to-parallel converter; and said decoupling module having means for electrical isolation of the communication equipment from the personal computer, and which has its output side connected to the serial data interface of the communication equipment and its input side connected to the parallel-to-serial converter.

2. A circuit arrangement according to claim 1, wherein said microprocessor module comprises means for converting Hayes command input data input thereto into a pulse sequence that is recognized by the communication equipment.

3. A circuit arrangement according to claim 1, wherein means is provided for switching the microprocessor module transparent upon command.

4. A circuit arrangement according to claim 1, wherein opto-electrical components in the decoupling module provide said electrical isolation of the communication equipment from the personal computer.

5. A circuit arrangement according to claim 4, wherein the opto-electrical components comprise optocouplers.

6. A circuit arrangement according to claim 1, including a power supply module means for powering the level-converting module, the microprocessor module, and the decoupling module, said power supply supply module means being electrically isolated from a reference potential of the communication equipment.

7. A circuit arrangement for data conversion in a data transmission between a serial data interface of a personal computer and a serial data interface of telecommunication equipment, comprising:

a microprocessor module arranged between a level converting module and a decoupling module, said microprocessor module comprising a serial-to-parallel converter arranged at an input side thereof, a parallel-to-serial converter arranged at an output side thereof, and a control means for converting data;

said level-converting module having its input side connected to the serial data interface of the personal computer and its output side connected to the serial-to-parallel converter; and said decoupling module having means for electrical isolation of the telecommunication equipment from the personal computer, and which has its output side connected to the serial data interface of the telecommunication equipment and its input side connected to the parallel-to-serial converter.

* * * * *